No. 732,943. PATENTED JULY 7, 1903.
C. JENATZY, FILS.
CLUTCH MECHANISM.
APPLICATION FILED DEC. 16, 1902.
NO MODEL.
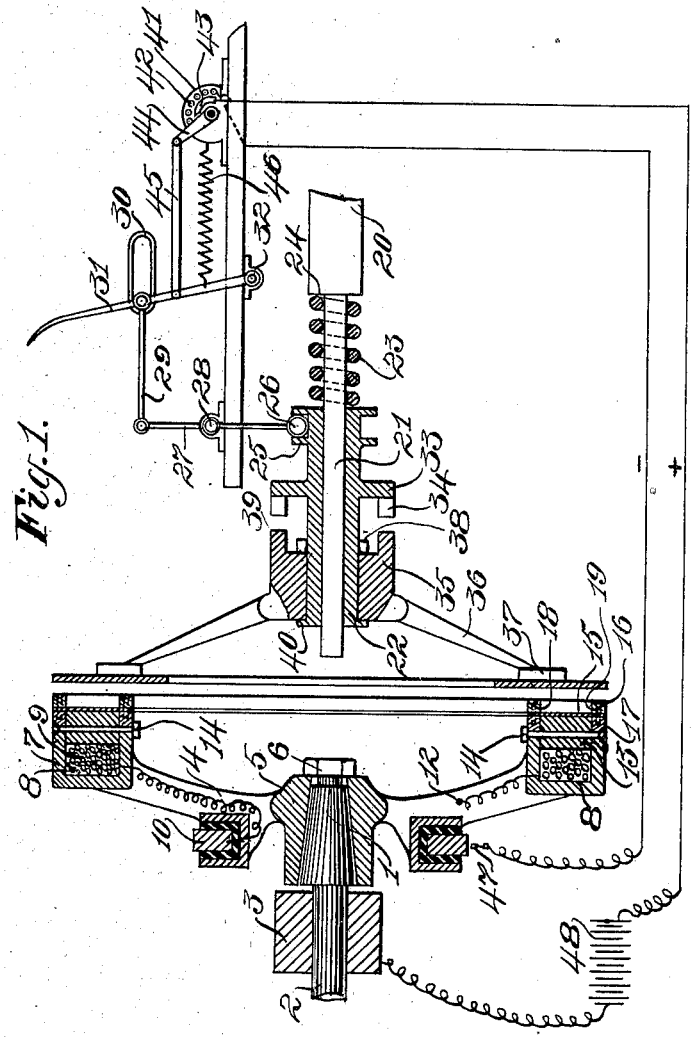
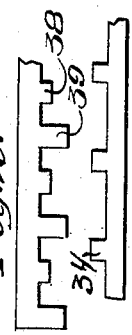
Witnesses:
C. A. Jarvis.
Fred. W. Barnaclo.
Inventor:
Camille Jenatzy, fils.
By his Attorney,
F. H. Richards.

No. 732,943. Patented July 7, 1903.

UNITED STATES PATENT OFFICE.

CAMILLE JENATZY, FILS, OF BRUSSELS, BELGIUM.

CLUTCH MECHANISM.

SPECIFICATION forming part of Letters Patent No. 732,943, dated July 7, 1903.

Application filed December 16, 1902. Serial No. 135,391. (No model.)

*To all whom it may concern:*

Be it known that I, CAMILLE JENATZY, Fils, engineer, a subject of the King of Belgium, and a resident of 222 Rue du Progres, Brussels, in the Kingdom of Belgium, have invented certain new and useful Improvements in and Relating to Clutch Mechanism; and I do hereby declare the following to be a full, clear, and exact description of the invention, such as will enable others skilled in the art to which it appertains to make and use the same, reference being had to the accompanying drawings, and to figures of reference marked thereon, which form a part of the specification.

This invention relates to magnetic clutches, and has for its objects to produce variable magnetic energies at will, to effect positive action of the clutch at will, and to produce an efficient, inexpensive, and durable structure.

In the drawings forming part of this specification, Figure 1 illustrates the device in elevation, the armature being represented as connected to a power-shaft, the clutch mechanism being connected to a driven shaft; and Fig. 2 shows the arrangement of teeth employed on the clutch members.

Similar characters of reference indicate like parts throughout the figures.

To a spindle 1 of a power-shaft 2, mounted in suitable bearings 3, is a member comprising arms 4 and a hub 5, which is held in place, preferably, by a nut 6. These arms 4 carry an annular rim 7, which is provided with a recess 8 and into which is wound a wire 9 to form an armature, one end of said wire being connected to a commutator 10, carried by and insulated, as at 11, to the arms 4, the other end being grounded to one of said arms 4, as at 12. The windings 9 are held in place by a washer 13, which is secured within the recess of the rim 7 by suitable means, such as bolts 14. Covering the washer 13 is a sheet-metal ring 15, preferably of brass, which is held in place by two concentric rings 16 and 17, respectively, preferably of soft metal, and which are secured to the lips of the rim 7 by screws 18 and 19, preferably of bronze, and this ring, as is obvious, provides against remnant magnetism at the armature.

A driving-shaft 20 is provided with a square extremity 21, upon which is mounted a sleeve 22, adapted to slide at will lengthwise upon said squared portion of the shaft 20, the sliding being facilitated by a compression-spring 23, disposed upon the squared portion of the shaft and interposed between the shoulder 24 and the extremity of the sleeve 22. This sleeve 22 is provided at one end with a collar 25, which receives the extremity 26 of a rocking lever 27, suitably mounted in bearings 28, and which is connected to a rod 29, provided with an elongated eye 30, in which is movably connected a lever 31, mounted in suitable bearings 32. This sleeve 22 is also provided with an annular plate or flange 33, around one side of which is disposed a series of teeth 34.

Mounted upon the sleeve 22 is a hub 35, having spokes 36, which carry a plate 37, preferably of soft iron, which is disposed in registry with the face of the armature. This hub 35 is also provided with teeth 38 and 39, which are adapted to engage the teeth 34 when the clutch is in operation. This hub rotates with easy friction upon the sleeve 22 and is held in place thereon by a flange 40, formed on said sleeve 22.

Suitably disposed in the region of the lever 31 is a rheostat 41, having various resistance-points 42, brush-segments 43, and a trailer 44, the trailer being connected to said lever 31 by a rod 45, so that when the lever 31 is released and gives effect to the action of the spring 46 through the instrumentality of the rod 45 the trailer 44 will contact with the brush 41 and the first resistance-point on the rheostat and form a switch.

A line of circuit is formed one end of which is connected to a segmental brush 43, whence it proceeds to the battery 48 and is grounded to the bearing 3, the other end of the circuit being connected to the rheostat 41 and terminating in a commutator-brush 47.

In practice the lever 31 is released, and an action of the spring 46 thereon causes it to reverse, which throws the trailer into contact with the first resistance-point of the rheostat 41 and the segmental brush 43, which closes the circuit and excites the armature, whereby the plate 37, carried by the hub 35, is attracted. The continuous rotation of the armature will cause the hub 35 to rotate, according to the amount of energy imparted to the armature through the instrumentality of the rheostat, it being understood that the more resistance offered at the rheostat the less permanent contact of the plate 37 to the armature, which of course allows some slipping motion in the plate. As the lever 31 is more freely drawn over to its other extreme, the resistance in the current is lessened, the energy in the armature is increased, finally causing permanent contact between said armature and the plate 37. At the same time the rocking frame 27, together with the compression-spring 23, forces the sleeve 22 over and causes the teeth 34 to engage with the teeth 38 and 39 of the hub 35. The pressure of the spring 23 will cause the teeth 34 to first frictionally bear against the face of the teeth 39 and finally against the teeth 38 laterally, which, as is obvious, gradually increases the momentum of the sleeve 22 and shaft 20, thereby avoiding severe shock. To release the clutch, the lever 31 is forced to its initial position, which will separate the teeth of the clutch and also break or open the circuit, whereby, as is obvious, the energy in the armature will be cut off.

It will be understood, of course, that any suitable means for controlling the lever 31 may be resorted to, also that variations of construction and arrangement may be resorted to within the purview of this invention.

It will now be seen that in this invention is comprised a power-shaft provided with a rotary armature, a driving-shaft, which has secured thereto a portion of a clutch mechanism, also mounted upon said shaft and adapted to be controlled by said armature, and means for energizing the armature to control the clutch, and, further, that by this arrangement one portion of the clutch may rotate independent of the other portion at variable speeds, according to the amount of current imparted to the armature, during which period the other portion of the clutch is being gradually interlocked with the first-named portion, whereby the shaft bearing the clutch may be gradually rotated, of course the speed being increased according to the increased current applied.

Having thus described my invention, I claim—

1. In a magnetic clutch, the combination of an armature, a clutch adapted to be engaged and released, a plate carried by said clutch and adapted to be attracted to said armature, means to operate said clutch, and means connected to said clutch-operating means for energizing the armature.

2. In a magnetic clutch, the combination of an armature, a clutch adapted to be engaged and released, a plate carried by said clutch and adapted to be attracted to said armature, means to operate said clutch, and means connected to said clutch-operating means for gradually energizing the armature.

3. In a magnetic clutch, the combination of a rotary armature, a clutch adapted to be engaged thereby and released therefrom, a lever for operating the clutch, and means connected to said lever for gradually energizing the armature.

4. In a magnetic clutch, the combination of a rotary armature, a clutch adapted to be rotated thereby, means for engaging and releasing the clutch, and means connected with the engaging and releasing means and the armature for gradually energizing the latter.

5. In a magnetic clutch, the combination of a rotary armature, a clutch adapted to be rotated thereby, means for engaging and releasing the clutch, and rheostat connected with the engaging and releasing means and the armature for gradually energizing the latter.

6. In a magnetic clutch, the combination of a rotary armature, a clutch adapted to be rotated thereby, a lever for engaging and releasing the clutch, and means connected with the engaging and releasing means and the armature for gradually energizing the latter.

7. In a magnetic clutch, the combination of a rotary armature, a clutch carrying a plate situated in registry with said armature, means for actuating said clutch and means for energizing the armature, attracting the clutch-plate, whereby the clutch mechanism may be operated.

8. In a clutch mechanism the combination of a rotatably-mounted armature, a rotatable clutch provided with a plate adapted to be attracted to said armature, means for engaging the clutch and means for energizing the armature to attract said plate.

9. In an electromagnetic clutch the combination of a rotatable armature mounted on a driving-shaft, a clutch carried by a driven shaft and having a metal plate, electrically-controlled means for energizing the armature to attract said plate and means for engaging clutch.

In testimony that I claim the foregoing as my invention I have signed my name in presence of two subscribing witnesses.

CAMILLE JENATZY, Fils.

Witnesses:
VICTOR LEONARD,
GEORGES DE REST.